United States Patent

Schuitema et al.

[11] Patent Number: 6,056,107
[45] Date of Patent: May 2, 2000

[54] COMPACT ARTICLE SINGULATION CONVEYOR

[75] Inventors: Dennis J. Schuitema, Ada; Ronald J. De Vree, Hudsonville, both of Mich.

[73] Assignee: Mannesmann Dematic Rapistan Corp., Grand Rapids, Mich.

[21] Appl. No.: 09/313,153

[22] Filed: May 17, 1999

Related U.S. Application Data

[63] Continuation of application No. 08/616,685, Mar. 15, 1996, Pat. No. 5,918,723.

[51] Int. Cl.$^7$ .................................................. B65G 1/00
[52] U.S. Cl. .................................. 198/347.4; 198/347.1; 198/443; 198/580
[58] Field of Search .............................. 198/347.1, 347.4, 198/448, 580, 443

[56] References Cited

U.S. PATENT DOCUMENTS

| | | |
|---|---|---|
| 1,990,549 | 2/1935 | Kimball . |
| 2,629,481 | 2/1953 | Stover . |
| 2,662,632 | 12/1953 | Black et al. . |
| 2,763,359 | 9/1956 | Rose . |
| 2,804,961 | 9/1957 | Carter . |
| 2,848,096 | 8/1958 | Luginbühl . |

(List continued on next page.)

FOREIGN PATENT DOCUMENTS

| | | |
|---|---|---|
| 0414210A1 | 2/1991 | European Pat. Off. . |
| 0780328A1 | 6/1997 | European Pat. Off. . |
| 1263644 | 3/1968 | Germany . |
| 2049627 | 4/1971 | Germany . |
| 3613724A1 | 10/1987 | Germany . |
| 4324536A1 | 1/1995 | Germany . |
| 0051415 | 3/1986 | Japan . |
| 2013637 | 8/1979 | United Kingdom . |
| 2256844 | 12/1992 | United Kingdom . |
| WO8101281 | 5/1981 | WIPO . |

OTHER PUBLICATIONS

A–1 Publicly disclosed system.
Commonly assigned co–pending application Serial No. 08/616,685, filed on Mar. 15, 1996, entitled Compact Article Singulation Conveyor.
Commonly assigned co–pending United States patent application Serial No. 09/131,817 filed on Aug. 10, 1998, entitled Compact Article Unscramlbler.
Commonly assigned co–pending United States patent application Serial No. 09/258,380, filed on Feb. 26, 1999, entitled Unscrambling and Aligning Conveyor.

*Primary Examiner*—James R. Bidwell
*Attorney, Agent, or Firm*—Van Dyke, Gardner, Linn & Burkhart, LLP

[57] ABSTRACT

A compact article singulation conveyor includes a receiving portion which receives articles in random order including clusters of side-by-side articles and a discharge portion from which articles are discharged in a single file singulated stream. A first conveying surface transports articles longitudinally from the receiving portion to the discharge portion. A recirculating bed removes side-by-side articles from a downstream portion of the first conveying surface to an upstream portion of the first conveying surface. The recirculating bed may be made up of at least one peel-away conveyor having a second conveying surface adapted to move side-by-side articles laterally off the first conveying surface, at least one coupling conveyor having a third conveying surface adapted to move articles from the second conveying surface upstream and at least one return conveyor having a fourth conveying surface adapted to move articles from the third conveying surface to the first conveying surface. Each of the conveying surfaces may be defined by a plurality of powered rollers. Clusters of articles tend to recirculate around the recirculation bed and the first conveying surface as individual articles of the cluster are pulled away along the first conveying surface. A take-away conveyor at the discharge portion includes a flow controller controlling the flow of articles discharged from the discharge portion.

38 Claims, 5 Drawing Sheets

U.S. PATENT DOCUMENTS

| | | |
|---|---|---|
| 2,988,195 | 6/1961 | McHugh, Jr. . |
| 3,104,753 | 9/1963 | Osborne . |
| 3,176,821 | 4/1965 | Eldred et al. . |
| 3,177,568 | 4/1965 | Schweiker . |
| 3,224,554 | 12/1965 | Moulder et al. . |
| 3,232,411 | 2/1966 | Kulig . |
| 3,239,086 | 3/1966 | Kirkpatrick . |
| 3,342,012 | 9/1967 | Reading . |
| 3,604,551 | 9/1971 | Fink . |
| 3,734,267 | 5/1973 | Tice . |
| 3,835,983 | 9/1974 | Horii . |
| 4,037,710 | 7/1977 | Brutcher . |
| 4,111,412 | 9/1978 | Cathers . |
| 4,252,232 | 2/1981 | Beck et al. . |
| 4,284,186 | 8/1981 | Brouwer . |
| 4,356,908 | 11/1982 | Embro, Jr. . |
| 4,815,580 | 3/1989 | Schanz et al. . |
| 4,889,224 | 12/1989 | Denker . |
| 5,147,023 | 9/1992 | Meindl . |
| 5,222,586 | 6/1993 | Ydoate et al. . |
| 5,240,101 | 8/1993 | LeMay et al. . |
| 5,301,791 | 4/1994 | Shampine . |
| 5,308,001 | 5/1994 | Grecksch et al. . |
| 5,372,238 | 12/1994 | Bonnet . |
| 5,400,896 | 3/1995 | Loomer . |
| 5,415,281 | 5/1995 | Taylor et al. . |
| 5,701,989 | 12/1997 | Boone et al. . |
| 5,738,202 | 4/1998 | Ydoate et al. . |
| 5,769,204 | 6/1998 | Okada et al. . |
| 5,918,723 | 7/1999 | Schuitema et al. .................. 198/347.4 |

COMPACT ARTICLE SINGULATION CONVEYOR

REFERENCE TO RELATED APPLICATION

This application is a continuation of application Ser. No. 08/616,685, filed Mar. 15, 1996, now U.S. Pat. No. 5,918,723.

BACKGROUND OF THE INVENTION

This invention relates generally to conveyor systems and, in particular, to systems which receive packages in a cluster including side-by-side packages and which rearrange the packages into a single file, singulated stream.

In U.S. Pat. No. 5,415,281, which is commonly assigned with the present application, an article singulation conveyor is disclosed which utilizes tapered rollers which are driven at a uniform speed for the length of the conveyor but which produce a continuous speed increase laterally towards a vertical belt. The tapered rollers may be divided up into plural lanes of rollers. The speed increase across the conveyor bed tends to arrange packages in single file because one of a pair of side-by-side packages will move ahead of the other as both are urged in the direction of the vertical belt. The device disclosed in this patent is exceptionally effective if provided in sufficient length, such as 60-foot sections.

Some conveyor installations are restricted in the amount of space available for singulating clusters of packages. This is particularly a problem with modifications to existing installations, as well as new installations in existing facilities which are often constrained on space.

Rearrangement of clusters of articles into singulated single file is especially difficult for packages having one dimension that is significantly greater than its other dimensions. If several such long and slender articles are conveyed side-by-side, conventional article singulation conveyors have difficulty breaking up the side-by-side pair into single file. This is an especially onerous task in a singulation conveyor that is relatively short in length.

Thus, the need exists for a compact article singulation conveyor which is exceptionally effective in separating side-by-side packages into a single file of singulated articles without requiring a long footprint. Such a compact article singulation conveyor must be capable of breaking up pairs of side-by-side articles.

SUMMARY OF THE INVENTION

The present invention fulfills the need for a compact article singulation conveyor which is exceptionally effective in rearranging clusters of articles into a singulated single file of articles.

An article singulation conveyor, according to the invention, includes an alignment bed having a longitudinally extending vertical guide surface and a conveying surface. The conveying surface is configured to convey articles longitudinally along the alignment bed while urging articles against the vertical guide surface. The article singulation conveyor further includes a recirculation bed extending opposite the guidance surface which recirculates articles from a downstream portion of the alignment bed to an upstream portion of the alignment bed. The article singulation conveyor further includes an inlet delivering articles upstream of the alignment bed and an outlet receiving singulated articles downstream of the alignment bed.

According to an aspect of the invention, the recirculating bed includes at least one peelaway conveyor having a conveying surface moving substantially perpendicularly away from the alignment bed, a return conveyor having a conveying surface moving substantially perpendicularly towards the alignment bed upstream of the peel-away conveyor, and a coupling conveyor having a conveying surface for conveying articles from the peel-away conveyor to the return conveyor. Such recirculation bed is exceptionally effective at breaking up clusters of articles and, thereby, facilitates the compact design of an article singulation conveyor according to this aspect of the invention.

According to another aspect of the invention, the guidance surface of the alignment bed has a portion which laterally slopes towards the recirculation bed. This configuration urges articles towards the peel-away conveyor of the recirculation bed so that side-by-side articles in a cluster are broken apart, with one of the articles remaining on the alignment bed and the side-by-side article, or articles, being recirculated by the recirculation bed.

In a preferred embodiment, the vertical guidance surface is defined by a longitudinally extending vertical belt having a surface moving in the direction of the alignment bed conveying surface. The vertical belt is propelled by a plurality of vertical pulleys. At least one of the pulleys is laterally offset in the direction of the recirculation bed. This structure provides a surface portion of the vertical belt which laterally slopes towards the recirculation bed in order to urge articles towards the peel-away conveyor. The offset roller may be fixedly positioned for conveyor systems having a substantially consistent article mix or may be laterally adjustable in position in order to provide adjustment for conveyor systems which handle different article mixes, for example, on a seasonal basis.

These and other objects, advantages, and features of this invention will become apparent upon review of the following specification in conjunction with the drawings.

DESCRIPTION OF THE PREFERRED EMBODIMENT

Figure 1:
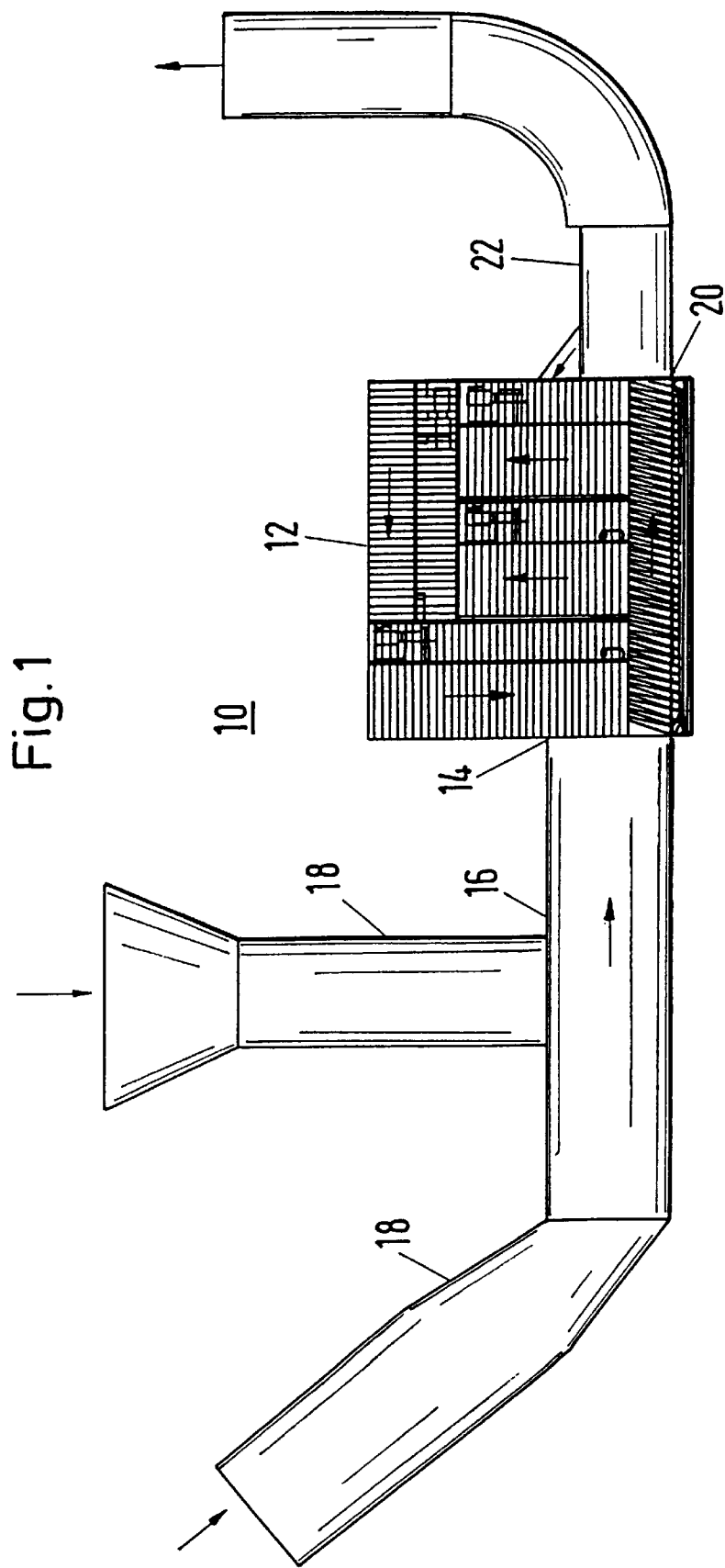
FIG. 1 is a top plan view of a conveyor system incorporating an article singulation conveyor, according to the invention.

Referring now specifically to the drawings, and the illustrative embodiments depicted therein, a conveyor system 10 includes an article singulation conveyor 12 having an inlet 14 which receives articles, typically in a cluster, from an infeed conveyor 16 (FIG. 1). Articles arrive on infeed conveyor 16 from a plurality of chutes 18 and, thereby, have a random orientation and may be arranged side-by-side. Other inducts than chutes may be used. Article singulation conveyor 12 further includes an outlet 20 which delivers articles single file and singulated to a take-away conveyor 22. By singulation is meant articles which are arranged in single file and may, or may not, be separated by a gap.

Figure 2:
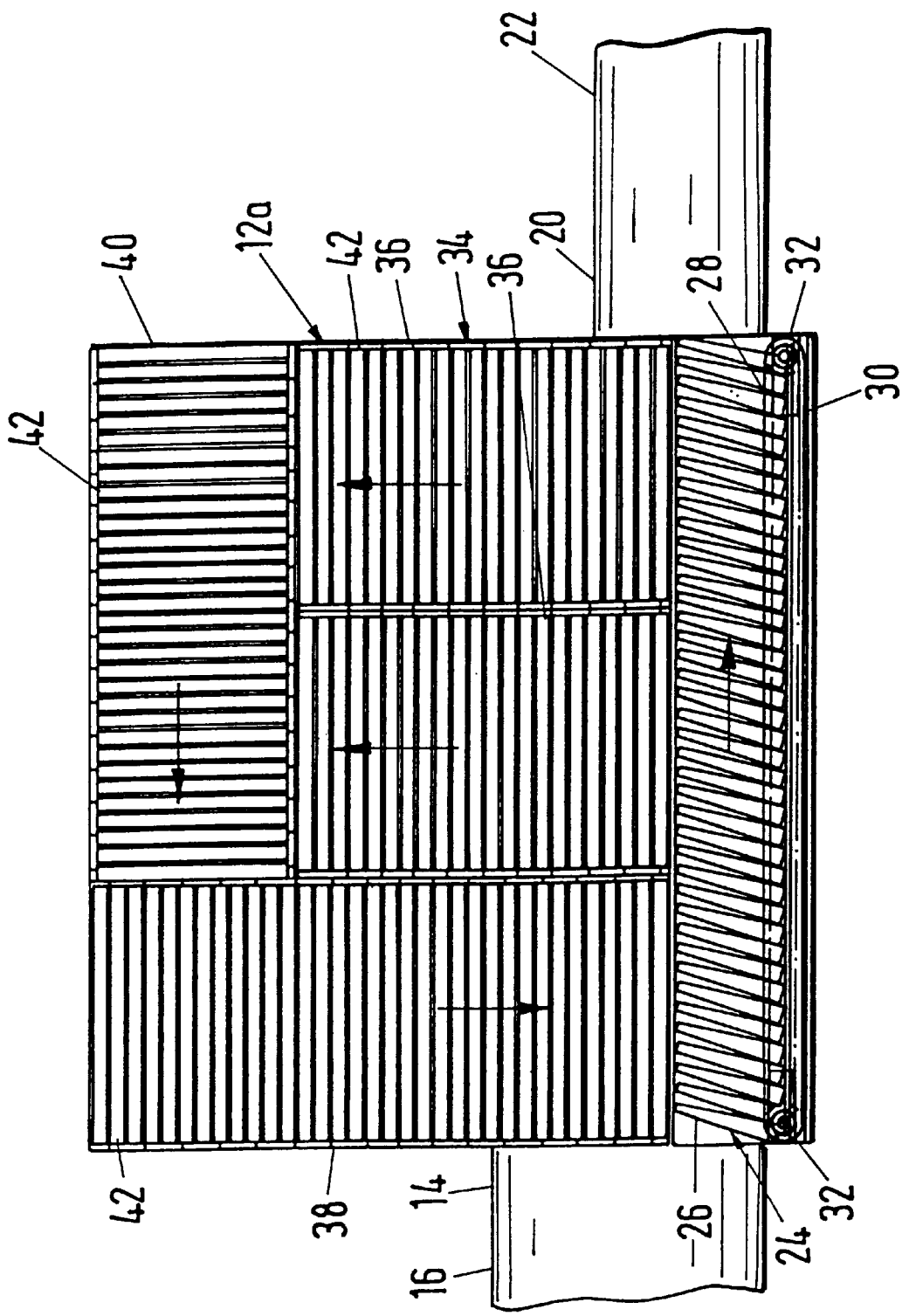
FIG. 2 is a top plan view of an article singulation conveyor, according to the invention.

In a first embodiment, an article singulation conveyor 12a includes an articulation bed 24 having a conveying surface made up of a plurality of generally parallel rollers 26 and a guide surface 28 which is longitudinally extending along the direction of article movement along the conveying surface of alignment bed 24 (FIG. 2). Rollers 26 are configured in order to urge articles laterally towards guide surface 28. This may be accomplished by various known techniques. In the illustrated embodiment, guide rollers 26 rotate about axes which are skewed with respect to guide surface 28. This tends to urge packages towards the guide surface. In order to further urge the articles towards the guide surface, rollers 26 may be tapered in order to produce a linear speed increase in the direction of the guide surface. This tends to separate side-by-side packages in the manner described in U.S. Pat. No. 5,415,281 issued to Eric R. Taylor, Curtis E. LeMay, Gerald A. Brouwer and Bernard H. Woltjer for a HIGH SPEED ARTICLE UNSCRAMBLER AND ALIGNER, the disclosure of which is hereby incorporated herein by reference. Alternatively, guide rollers 26 may be cylindrical; namely, having a consistent diameter across the roller. In the illustrated embodiment, guide surface 28 is defined by a vertical belt 30 which is movably supported by a pair of vertical axis pulleys 32. Preferably, guide surface 28 moves in the direction of product flow along the conveying surface of alignment 24 at the same, or greater, speed as the speed of articles propelled along the alignment bed conveying surface. In the illustrated embodiment, rollers 26 of alignment bed 24 are powered with a subjacent driven endless member such as a belt or padded chain.

Article singulation conveyor 12a further includes a recirculation bed 34 which extends from alignment bed 24 in a direction opposite guide surface 28. In the illustrated embodiment, recirculation bed includes one or more peel-away conveyors 36 having conveying surfaces directing articles perpendicularly away from alignment bed 24. Recirculation bed 34 additionally includes at least one return conveyor 38 having a conveying surface which conveys articles perpendicularly toward alignment bed 24. Recirculation bed 34 additionally includes at least one coupling conveyor 40 having a conveying surface which conveys articles from peel-away conveyors 36 to return conveyor 38. In the illustrated embodiment, coupling conveyor 40 has a conveying surface which conveys articles in a direction which is perpendicular to both peel-away conveyor 36 and return conveyor 38. In the illustrated embodiment, the conveying surfaces of peel-away conveyors 36, return conveyor 38, and coupling conveying 40 are defined by a multiplicity of powered cylindrical rollers 42 which are powered by a subjacent driven endless member, such as a belt or padded chain (not shown). Alternatively, rollers 26 and 42 may be individually powered by a line-shaft or other known propulsion means. In the illustrated embodiment, infeed conveyor 16 and take-away conveyor 22 are belt conveyors but other conveyors may be used.

Article singulation conveyor 12a operates as follows. Clusters of articles being fed to inlet 14 by infeed conveyor 16 are urged in the direction of vertical guide surface 28 by the motion of the conveying surface of return conveyor 38 and the lateral bias of the conveying surface of alignment bed 24. Some side-by-side articles in the cluster will be broken apart by the combined action of rollers 26 and guide surface 28 in the manner described in the Taylor et al. '281 patent. Articles which remain side-by-side should come into contact with one of the peel-away conveyors 36, which will move the side-by-side article laterally away from the vertical belt 28 in a direction opposite guide surface 28. Articles removed in this manner will be discharged onto coupling conveyor 40 and from coupling conveyor 40 onto return conveyor 38 where the articles will be circulated back to alignment bed 24. As clusters of articles are received by article singulation conveyor 12a, the clusters tend to recirculate around alignment bed 24 and recirculation bed 34 as individual articles of the cluster are pulled away along alignment bed 24 and discharged in a single file singulated manner to outlet 20 and take-away conveyor 22.

Figure 3:
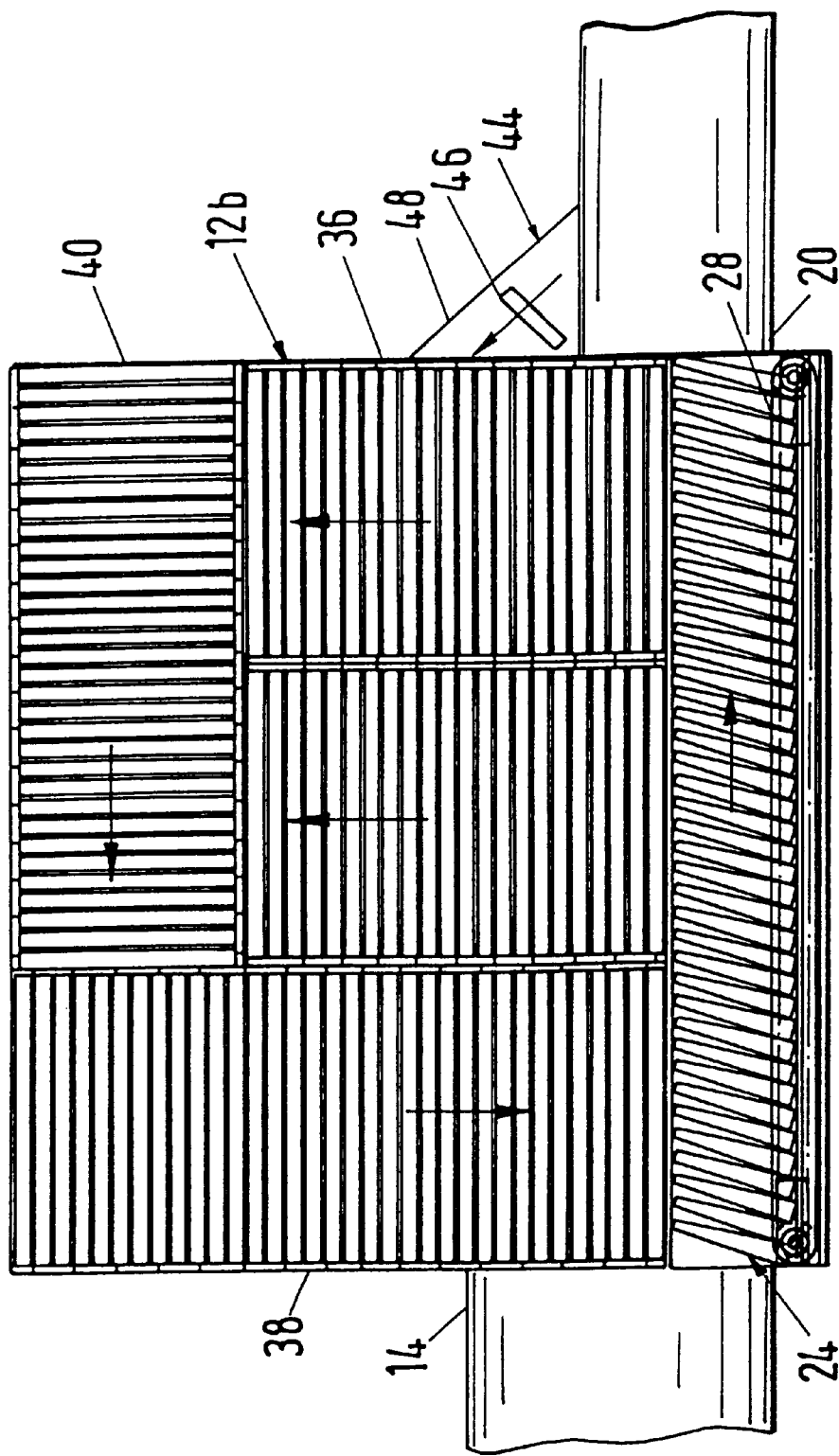
FIG. 3 is the same view as FIG. 2 of an alternative embodiment.

Occasionally, clusters of articles may, because of their mix of article sizes, be forced downstream, laterally off peel-away conveyors 36. In order to prevent such clusters from jamming, an article singulation conveyor 12b includes a reverse direction section 44 (FIG. 3). Reverse direction section 44 includes one or more powered rollers 46 which move product in the direction indicated by the arrow in FIG. 3. Although only one powered roller 46 is illustrated in FIG. 3, reverse direction section 44 may be entirely made up of such powered rollers. Reverse direction section 44 additionally includes an outer vertical wall 48 in order to further assist in returning packages to peel-away conveyor 36.

Figure 4:
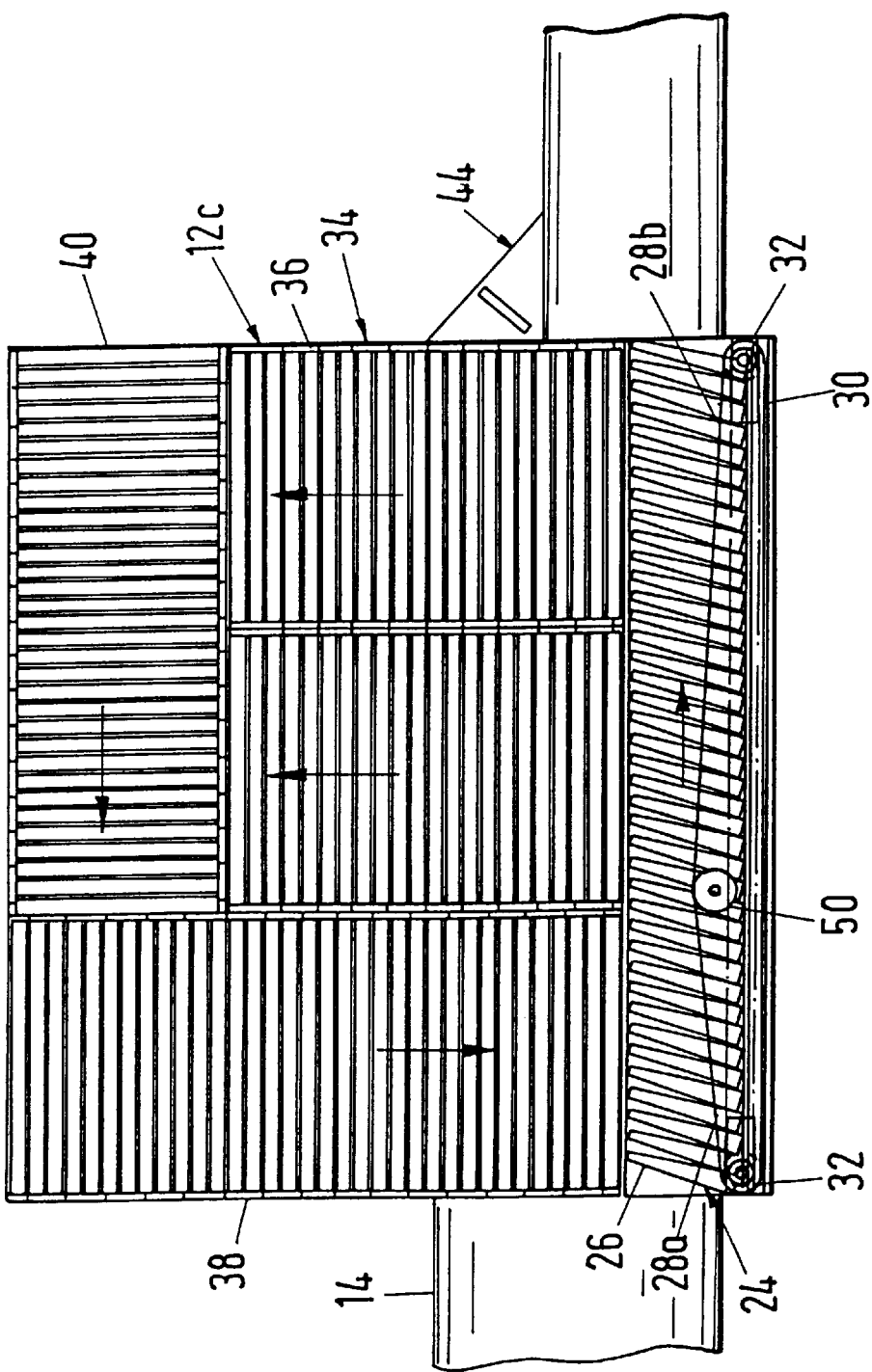
FIG. 4 is the same view as FIGS. 2 and 3 of a second alternative embodiment.

In a third embodiment, an article singulation conveyor 12c has a third vertical pulley 50 for movably supporting guiding vertical belt 30 (FIG. 4). Vertical pulley 50 is laterally offset from the location of vertical pulleys 32 in the direction of recirculating bed 34. Because of such offset, vertical pulley 50 divides guide surface 28 into a first guide surface portion 28a and a second guide surface portion 28b. Guide surface portion 28a slopes in the direction of recirculating bed 34. Because guide surface 28a slopes in the direction of the recirculation conveyor, it tends to throttle package clusters in a confined area between pulley 50 and peel-away conveyors 36. This increases the likelihood that one of the peel-away conveyors will remove any side-by-side articles from any articles in contact with the guide surface. By positioning vertical roller 50 at a suitable distance from the peel-away conveyors, side-by-side packages can be more effectively separated. In the embodiment illustrated in FIG. 4, vertical pulley 50 is fixedly mounted. However, vertical pulley 50 could alternatively be adjustably mounted, in a manner which would be within the capabilities of the skilled artisan, if the mix of articles handled by the conveyor system changes in a predictable fashion. For example, a warehouse may handle one particular product mix in the summer and a different product mix in the winter. The lateral position of vertical pulley 50 could be modified in order to accommodate such change in product mix.

Figure 5:
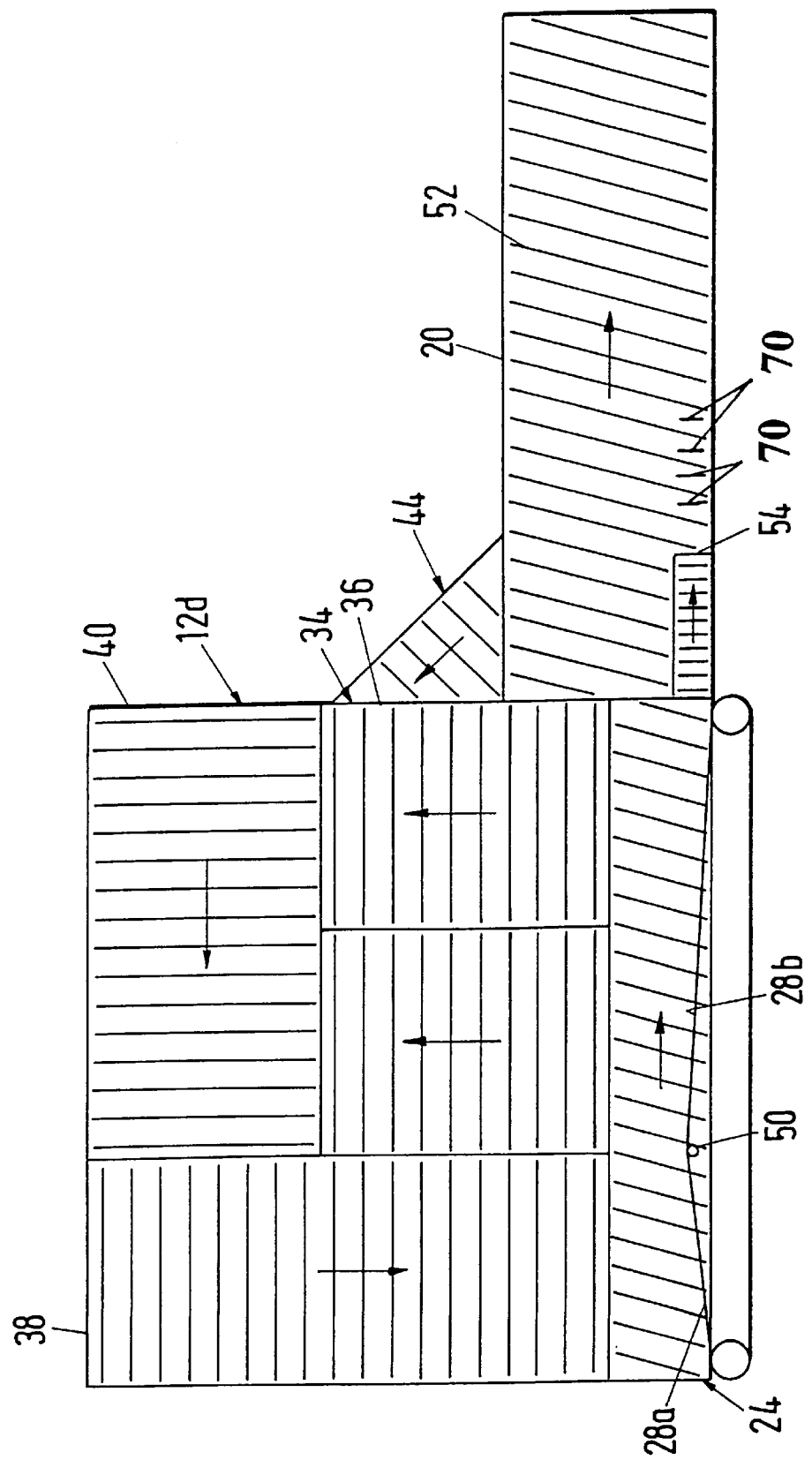
FIG. 5 is the same view as FIGS. 2–4 of a third alternative embodiment.

In another embodiment, an article singulation conveyor 12d includes an outlet 20 made up of a multiplicity of skewed rollers 52 which extend partially or fully across the conveying surface and a multiplicity of shorter rollers 54 which extend partway across the conveying surface (FIG. 5). Rollers 54 are in line with alignment bed 24. Rollers 54 are operated at a slower speed than rollers 52. This provides a drag on packages being discharged directly from alignment bed 24 while allowing packages which are side-by-side with packages being discharged from the alignment bed to be moved forward thereof. This provides an additional separation means to separate side-by-side packages which are not separated by the remaining portion of article circulation conveyor 12d.

As an alternative to, or in addition to, such slower speed bed, a plurality of protrusions 70 may be provided extending inwardly from the side of outlet 20 in line with guidance surface 28, or extending upwardly between rollers 52 slightly above the conveying surface. Such protrusions would be configured to slow down, but not completely stop, articles being discharged from alignment bed 24 in order to allow a side-by-side article to move ahead of the article discharged by the alignment bed. In this manner, additional separation means are provided for further separating side-by-side articles which are not separated by the remainder of article singulation conveyor.

An article singulation conveyor, according to the invention, has been successfully built and tested and found to be exceptionally effective in repositioning clusters of articles into singulated, single file arrangements.

Modifications may suggest themselves to those of ordinary skill in the art. For example, the roller, or rollers, 26 of peel-away conveyors 36 closest to alignment bed 24 may be made from a high-friction material in order to further assist in peeling away side-by-side articles.

Changes and modifications in the specifically described embodiments can be carried out without departing from the principles of the invention, which is intended to be limited only by the scope of the appended claims, as interpreted according to the principles of patent law including the doctrine of equivalents.

What is claimed is:

1. An article singulation conveyor, comprising:
   a receiving portion to which articles are delivered in random order including clusters of side-by-side articles and a discharge portion from which articles are discharged in a single file singulated stream;
   a first conveying surface defined by a plurality of generally laterally extending powered rollers that is adapted to transport articles longitudinally from said receiving portion to said discharge portion;
   a recirculation bed which removes side-by-side articles from a downstream portion of the first conveying surface to an upstream portion of the first conveying surface, wherein clusters of articles tend to recirculate around said recirculation bed and said first conveying surface as individual articles of the cluster are pulled away along said first conveying surface;
   a take-away conveyor at said discharge portion comprising a flow controller controlling relative speed of articles as the articles move in a same direction from said discharged portion.

2. The article singulation conveyor in claim 1 wherein said flow controller comprises separation means for further separating side-by-side articles.

3. The article singulation conveyor in claim 2 wherein said separation means comprises fixed protrusions.

4. The article singulation conveyor in claim 1 wherein said flow controller comprises a conveying surface driven separately from said discharge portion.

5. The article singulation conveyor in claim 1 wherein said recirculation conveyor comprises at least one peel-away conveyor having a second conveying surface moving side-by-side articles away from said first conveying surface.

6. The article singulation conveyor in claim 5 wherein said recirculation conveyor further comprises a coupling conveyor having a third conveying surface conveying articles from said peel-away conveyor upstream toward said receiving portion.

7. The article singulation conveyor in claim 6 wherein said recirculation conveyor further comprises at least one return conveyor having a fourth conveying surface conveying articles from said coupling conveyor toward said first conveying surface.

8. The article singulation conveyor in claim 1 including a guidance surface along said first conveying surface opposite said recirculation bed.

9. The article singulation conveyor in claim 8 wherein said guidance surface comprises a travelling vertical belt.

10. The article singulation conveyor in claim 1 wherein said recirculation bed comprises a plurality of powered rollers.

11. An article singulation conveyor, comprising:
    a receiving portion to which articles are delivered in random order including clusters of side-by-side articles and a discharge portion from which articles are discharged in a single file singulated stream;
    a first conveying surface defined by a plurality of generally laterally extending powered rollers that is adapted to transport articles longitudinally from said receiving portion to said discharge portion, wherein said first conveying surface has a substantially uniform width;
    a recirculation bed which removes side-by-side articles from a downstream portion of the first conveying surface to an upstream portion of the first conveying surface, wherein clusters of articles tend to recirculate around said recirculation bed and said first conveying surface as individual articles of the cluster are pulled away along said first conveying surface; and
    a take-away conveyor at said discharge portion comprising a flow controller controlling flow of articles discharged from said discharged portion.

12. An article singulation conveyor, comprising:
    a receiving portion to which articles are delivered in random order including clusters of side-by-side articles and a discharge portion from which articles are discharged in a single file singulated stream;
    a first conveying surface defined by a plurality of generally laterally extending powered rollers that is adapted to transport articles longitudinally from said receiving portion to said discharge portion, wherein said powered rollers are driven at substantially the same speed from said receiving portion to said discharge portion;
    a recirculation bed which removes side-by-side articles from a downstream portion of the first conveying surface to an upstream portion of the first conveying surface, wherein clusters of articles tend to recirculate around said recirculation bed and said first conveying surface as individual articles of the cluster are pulled away along said first conveying surface; and
    a take-away conveyor at said discharge portion comprising a flow controller controlling flow of articles discharged from said discharged portion.

13. The article singulation conveyor in claim 12 wherein said powered rollers are tapered.

14. The article singulation conveyor in claim 13 wherein said parallel rollers are tapered in a manner that provides a faster speed opposite said recirculation bed.

15. An article singulation conveyor, comprising:
    a receiving portion to which articles are delivered in random order including clusters of side-by-side articles and a discharge portion from which articles are discharged in a single file singulated stream;
    a first conveying surface defined by a plurality of generally laterally extending powered rollers that is adapted to transport articles longitudinally from said receiving portion to said discharge portion, said first conveying surface having a substantially uniform width and said powered rollers driven at substantially the same speed from said receiving portion to said discharge portion; and
    a recirculation bed which removes side-by-side articles from a downstream portion of the first conveying surface to an upstream portion of the first conveying surface, wherein clusters of articles tend to recirculate around said recirculation bed and said first conveying surface as individual articles of the cluster are pulled away along said first conveying surface.

16. The article singulation conveyor in claim 15 wherein said powered rollers are tapered.

17. The article singulation conveyor in claim 16 wherein said parallel rollers are tapered in a manner that provides a faster speed opposite said recirculation bed.

18. The article singulation conveyor in claim 15 including a take-away conveyor at said discharge portion comprising a flow controller controlling flow of articles discharged from said discharge portion.

19. The article singulation conveyor in claim 18 wherein said flow controller comprises separation means for further separating side-by-side articles.

20. The article singulation conveyor in claim 18 wherein said flow controller comprises a conveying surface driven separately from said discharge portion.

21. The article singulation conveyor in claim 15 wherein said recirculation conveyor comprises at least one peel-away conveyor having a second conveying surface moving side-by-side articles away from said first conveying surface.

22. The article singulation conveyor in claim 21 wherein said recirculation conveyor further comprises a coupling conveyor having a third conveying surface conveying articles from said peel-away conveyor upstream toward said receiving portion.

23. The article singulation conveyor in claim 22 wherein said recirculation conveyor further comprises at least one return conveyor having a fourth conveying surface conveying articles from said coupling conveyor toward said first conveying surface.

24. The article singulation conveyor in claim 15 including a guidance surface along said first conveying surface opposite said recirculation bed.

25. The article singulation conveyor in claim 24 wherein said guidance surface comprises a travelling vertical belt.

26. The article singulation conveyor in claim 15 wherein said recirculation bed comprises a plurality of powered rollers.

27. An article singulation conveyor, comprising:
  a receiving portion to which articles are delivered in random order including clusters of side-by-side articles and a discharge portion from which articles are discharged in a single file singulated stream;
  a first conveying surface defined by a plurality of generally laterally extending powered rollers that is adapted to transport articles longitudinally from said receiving portion to said discharge portion, said powered rollers comprising tapered rollers that are driven at substantially the same speed from said receiving portion to said discharge portion; and
  a recirculation bed which removes side-by-side articles from a downstream portion of the first conveying surface to an upstream portion of the first conveying surface, wherein clusters of articles tend to recirculate around said recirculation bed and said first conveying surface as individual articles of the cluster are pulled away along said first conveying surface.

28. The article singulation conveyor in claim 27 wherein said first conveying surface has a substantially uniform width.

29. The article singulation conveyor in claim 27 wherein said parallel rollers are tapered in a manner that provides a faster speed opposite said recirculation bed.

30. The article singulation conveyor in claim 27 including a take-away conveyor at said discharge portion comprising a flow controller controlling flow of articles discharged from said discharge portion.

31. The article singulation conveyor in claim 30 wherein said flow controller comprises separation means for further separating side-by-side articles.

32. The article singulation conveyor in claim 30 wherein said flow controller comprises a conveying surface driven separately from said discharge portion.

33. The article singulation conveyor in claim 27 wherein said recirculation conveyor comprises at least one peel-away conveyor having a second conveying surface moving side-by-side articles away from said first conveying surface.

34. The article singulation conveyor in claim 33 wherein said recirculation conveyor further comprises a coupling conveyor having a third conveying surface conveying articles from said peel-away conveyor upstream toward said receiving portion.

35. The article singulation conveyor in claim 34 wherein said recirculation conveyor further comprises at least one return conveyor having a fourth conveying surface conveying articles from said coupling conveyor toward said first conveying surface.

36. The article singulation conveyor in claim 27 including a guidance surface along said first conveying surface opposite said recirculation bed.

37. The article singulation conveyor in claim 32 wherein said guidance surface comprises a travelling vertical belt.

38. The article singulation conveyor in claim 27 wherein said recirculation bed comprises a plurality of powered rollers.

* * * * *

UNITED STATES PATENT AND TRADEMARK OFFICE
CERTIFICATE OF CORRECTION

PATENT NO.   : 6,056,107  
DATED        : May 2, 2000  
INVENTOR(S)  : Dennis J. Schuitema and Ronald J. De Vree Page 1 of 1

It is certified that error appears in the above-identified patent and that said Letters Patent is hereby corrected as shown below:

Column 5,
Line 38, after ";" insert --and--

Column 8,
Line 44, "claim 32" should be --claim 36--

Signed and Sealed this

Third Day of July, 2001

*Attest:*

*Attesting Officer*

NICHOLAS P. GODICI  
*Acting Director of the United States Patent and Trademark Office*